US008295306B2

(12) United States Patent
Bagepalli et al.

(10) Patent No.: US 8,295,306 B2
(45) Date of Patent: Oct. 23, 2012

(54) LAYER-4 TRANSPARENT SECURE TRANSPORT PROTOCOL FOR END-TO-END APPLICATION PROTECTION

(75) Inventors: Nagaraj Bagepalli, San Jose, CA (US); Prashant Gandhi, San Jose, CA (US); Abhijit Patra, San Jose, CA (US); Kirti Prabhu, San Jose, CA (US); Anant Thakar, Cupertino, CA (US)

(73) Assignee: Cisco Technologies, Inc., San Jose, CA (US)

( * ) Notice: Subject to any disclaimer, the term of this patent is extended or adjusted under 35 U.S.C. 154(b) by 156 days.

(21) Appl. No.: 12/101,862

(22) Filed: Apr. 11, 2008

(65) Prior Publication Data
US 2009/0059957 A1 Mar. 5, 2009

Related U.S. Application Data

(60) Provisional application No. 60/966,649, filed on Aug. 28, 2007.

(51) Int. Cl.
*H04J 3/16* (2006.01)
(52) U.S. Cl. ........................................................ 370/469
(58) Field of Classification Search .................. 380/257, 380/255; 713/201, 153; 386/94; 719/321; 370/469
See application file for complete search history.

(56) References Cited

U.S. PATENT DOCUMENTS

| | | | |
|---|---|---|---|
| 5,444,782 A * | 8/1995 | Adams et al. | ................ 713/153 |
| 5,706,429 A | 1/1998 | Lai et al. | |
| 6,131,120 A | 10/2000 | Reid | |
| 6,205,480 B1 | 3/2001 | Broadhurst et al. | |
| 6,223,217 B1 | 4/2001 | Pettus | |
| 6,460,141 B1 | 10/2002 | Olden | |
| 6,553,408 B1 | 4/2003 | Merrell et al. | |
| 6,594,712 B1 | 7/2003 | Pettey et al. | |
| 6,640,238 B1 | 10/2003 | Bowman-Amuah | |
| 6,675,200 B1 | 1/2004 | Cheriton et al. | |
| 6,728,884 B1 | 4/2004 | Lim | |
| 6,754,829 B1 | 6/2004 | Butt et al. | |
| 6,804,720 B1 | 10/2004 | Vilander et al. | |

(Continued)

FOREIGN PATENT DOCUMENTS
WO   WO 03/104943 A2   12/2003
(Continued)

OTHER PUBLICATIONS

International Search Report and Written Opinion mailed Feb. 2, 2009, for International Application No. PCT/US08/10080, 10 pages.

(Continued)

*Primary Examiner* — Anh-Vu Ly
*Assistant Examiner* — Gbemileke Onamuti

(57) ABSTRACT

Techniques for providing layer 4 transparent secure transport for end-to-end application protection are described herein. According to one embodiment, a packet of a network transaction is received from a client over a first network, where the packet is destined to a server of a data center having a plurality of servers over a second network. The packet includes a payload encrypted without encrypting information needed for a layer 4 of OSI (open system interconnection) layers of network processes. The layer 4 process is performed on the packet without having to decrypting the payload to determine whether the packet is eligible to access the destined server over the second network based on the unencrypted layer 4 information. Other methods and apparatuses are also described.

22 Claims, 8 Drawing Sheets

U.S. PATENT DOCUMENTS

| | | |
|---|---|---|
| 6,889,294 B1 | 5/2005 | Nichols et al. |
| 6,901,491 B2 | 5/2005 | Kohn et al. |
| 6,912,604 B1 | 6/2005 | Tzeng et al. |
| 6,922,724 B1 | 7/2005 | Freeman et al. |
| 6,947,984 B2 | 9/2005 | Schweitzer et al. |
| 6,985,956 B2 | 1/2006 | Luke et al. |
| 6,986,040 B1 | 1/2006 | Kramer et al. |
| 6,999,462 B1 | 2/2006 | Acharya |
| 7,010,807 B1 | 3/2006 | Yanovsky |
| 7,051,126 B1 | 5/2006 | Franklin |
| 7,088,727 B1 | 8/2006 | Short et al. |
| 7,100,200 B2 | 8/2006 | Pope et al. |
| 7,114,096 B2 | 9/2006 | Freimuth et al. |
| 7,114,180 B1 | 9/2006 | DeCaprio |
| 7,117,526 B1 | 10/2006 | Short |
| 7,120,792 B1 | 10/2006 | Jacobson et al. |
| 7,146,635 B2 | 12/2006 | Eggebraaten et al. |
| 7,149,808 B2 | 12/2006 | Lu |
| 7,149,817 B2 | 12/2006 | Pettey |
| 7,149,819 B2 | 12/2006 | Pettey |
| 7,149,892 B2 | 12/2006 | Freed et al. |
| 7,162,566 B2 | 1/2007 | Lin |
| 7,171,453 B2 | 1/2007 | Iwami |
| 7,171,681 B1 | 1/2007 | Duncan et al. |
| 7,178,163 B2 | 2/2007 | Reeves, Jr. |
| 7,185,192 B1 | 2/2007 | Kahn |
| 7,185,361 B1 | 2/2007 | Ashoff et al. |
| 7,185,364 B2 | 2/2007 | Knouse et al. |
| 7,194,554 B1 | 3/2007 | Short et al. |
| 7,197,556 B1 | 3/2007 | Short et al. |
| 7,209,478 B2 | 4/2007 | Rojas et al. |
| 7,209,970 B1 | 4/2007 | Everson et al. |
| 7,216,152 B2 | 5/2007 | Short et al. |
| 7,216,225 B2 | 5/2007 | Haviv et al. |
| 7,225,364 B2 | 5/2007 | Carnevale et al. |
| 7,228,412 B2 | 6/2007 | Freed et al. |
| 7,308,101 B2 * | 12/2007 | Wing .............................. 380/257 |
| 7,350,229 B1 | 3/2008 | Lander |
| 7,447,220 B2 | 11/2008 | Lu et al. |
| 7,584,301 B1 | 9/2009 | Joshi |
| 7,630,877 B2 | 12/2009 | Brown et al. |
| 7,633,955 B1 | 12/2009 | Saraiya et al. |
| 7,657,613 B1 | 2/2010 | Hanson et al. |
| 7,693,991 B2 | 4/2010 | Greenlee et al. |
| 7,764,678 B2 | 7/2010 | Johnson et al. |
| 7,895,463 B2 | 2/2011 | Bagepalli et al. |
| 2002/0085578 A1 | 7/2002 | Dell et al. |
| 2002/0129271 A1 * | 9/2002 | Stanaway et al. ............. 713/201 |
| 2002/0156867 A1 | 10/2002 | Iwami |
| 2002/0199006 A1 | 12/2002 | Magnussen et al. |
| 2003/0005073 A1 | 1/2003 | Yoshizawa et al. |
| 2003/0043794 A1 | 3/2003 | Cayton et al. |
| 2003/0093541 A1 | 5/2003 | Lolayekar et al. |
| 2003/0093567 A1 | 5/2003 | Lolayekar et al. |
| 2003/0097454 A1 | 5/2003 | Yamakawa et al. |
| 2003/0097518 A1 | 5/2003 | Kohn et al. |
| 2003/0174467 A1 | 9/2003 | Lu |
| 2004/0010545 A1 | 1/2004 | Pandya |
| 2004/0010612 A1 | 1/2004 | Pandya |
| 2004/0030757 A1 | 2/2004 | Pandya |
| 2004/0030770 A1 | 2/2004 | Pandya |
| 2004/0030806 A1 | 2/2004 | Pandya |
| 2004/0037299 A1 | 2/2004 | Pandya |
| 2004/0037319 A1 | 2/2004 | Pandya |
| 2004/0107383 A1 | 6/2004 | Bouchier et al. |
| 2004/0128538 A1 | 7/2004 | Gmuender et al. |
| 2004/0139319 A1 | 7/2004 | Favazza et al. |
| 2004/0165588 A1 | 8/2004 | Pandya |
| 2004/0179522 A1 | 9/2004 | Basso et al. |
| 2004/0193695 A1 | 9/2004 | Salo et al. |
| 2004/0210320 A1 | 10/2004 | Pandya |
| 2005/0033880 A1 | 2/2005 | Lin |
| 2005/0076166 A1 | 4/2005 | Shearer |
| 2005/0108518 A1 | 5/2005 | Pandya |
| 2005/0147039 A1 | 7/2005 | Biran et al. |
| 2005/0188212 A1 | 8/2005 | Laferriere et al. |
| 2005/0238035 A1 | 10/2005 | Riley |
| 2005/0286513 A1 | 12/2005 | King |
| 2006/0031506 A1 | 2/2006 | Redgate |
| 2006/0045099 A1 | 3/2006 | Chang et al. |
| 2006/0047771 A1 | 3/2006 | Blackmore et al. |
| 2006/0067346 A1 | 3/2006 | Tucker et al. |
| 2006/0069668 A1 | 3/2006 | Braddy et al. |
| 2006/0070131 A1 | 3/2006 | Braddy et al. |
| 2006/0074837 A1 | 4/2006 | Braddy et al. |
| 2006/0075057 A1 | 4/2006 | Gildea et al. |
| 2006/0075114 A1 | 4/2006 | Panasyuk et al. |
| 2006/0075132 A1 | 4/2006 | Liu |
| 2006/0075463 A1 | 4/2006 | Braddy et al. |
| 2006/0078120 A1 * | 4/2006 | Mahendran et al. .......... 380/255 |
| 2006/0087989 A1 | 4/2006 | Gai et al. |
| 2006/0095334 A1 | 5/2006 | Simmons |
| 2006/0101225 A1 | 5/2006 | Aloni et al. |
| 2006/0123481 A1 | 6/2006 | Bhatnagar et al. |
| 2006/0136570 A1 | 6/2006 | Pandya |
| 2006/0168274 A1 | 7/2006 | Alone et al. |
| 2006/0174104 A1 | 8/2006 | Crichton et al. |
| 2006/0200477 A1 | 9/2006 | Barrenechea |
| 2006/0230119 A1 | 10/2006 | Hausauer et al. |
| 2006/0233101 A1 | 10/2006 | Luft et al. |
| 2006/0236063 A1 | 10/2006 | Hausauer et al. |
| 2006/0236385 A1 | 10/2006 | Innes et al. |
| 2006/0253894 A1 | 11/2006 | Bookman et al. |
| 2006/0259661 A1 | 11/2006 | Feng et al. |
| 2006/0262782 A1 | 11/2006 | Biran et al. |
| 2006/0262796 A1 | 11/2006 | Biran et al. |
| 2006/0262797 A1 | 11/2006 | Biran et al. |
| 2006/0262799 A1 | 11/2006 | Biran et al. |
| 2006/0268866 A1 | 11/2006 | Lok |
| 2006/0291803 A1 * | 12/2006 | Watson et al. .................. 386/94 |
| 2007/0002769 A1 | 1/2007 | Matityahu et al. |
| 2007/0005801 A1 | 1/2007 | Kumar et al. |
| 2007/0067638 A1 | 3/2007 | Haibl et al. |
| 2007/0073966 A1 | 3/2007 | Corbin |
| 2007/0086456 A1 | 4/2007 | Kim et al. |
| 2007/0121615 A1 | 5/2007 | Weill et al. |
| 2007/0130167 A1 | 6/2007 | Day et al. |
| 2007/0153798 A1 | 7/2007 | Krstulich |
| 2007/0160072 A1 | 7/2007 | Thalanany et al. |
| 2007/0160073 A1 | 7/2007 | Toumura et al. |
| 2007/0165672 A1 | 7/2007 | Keels et al. |
| 2007/0171921 A1 | 7/2007 | Wookey et al. |
| 2007/0174429 A1 | 7/2007 | Mazzaferri et al. |
| 2007/0179955 A1 | 8/2007 | Croft et al. |
| 2007/0180088 A1 | 8/2007 | Zhao |
| 2007/0180447 A1 | 8/2007 | Mazzaferri et al. |
| 2007/0180493 A1 | 8/2007 | Croft et al. |
| 2007/0226750 A1 | 9/2007 | Sharp et al. |
| 2008/0165964 A1 * | 7/2008 | Lewis et al. ................... 380/255 |
| 2008/0184276 A1 * | 7/2008 | Jong .............................. 719/321 |
| 2009/0300301 A1 | 12/2009 | Vaghani |

FOREIGN PATENT DOCUMENTS

| | | |
|---|---|---|
| WO | WO 2005/081855 A2 | 9/2005 |
| WO | WO 2005/104443 A2 | 11/2005 |
| WO | WO 2006/031496 A2 | 3/2006 |
| WO | WO 2006/113722 A2 | 10/2006 |

OTHER PUBLICATIONS

Office action in co-pending U.S. Appl. No. 12/101,872, mailed Aug. 19, 2011.

Office action in co-pending U.S. Appl. No. 12/101,874, mailed Sep. 2, 2011.

* cited by examiner

LAYER-4 TRANSPARENT SECURE TRANSPORT PROTOCOL FOR END-TO-END APPLICATION PROTECTION

RELATED APPLICATIONS

This application claims the benefit of U.S. Provisional Patent Application No. 60/966,649, filed Aug. 28, 2007, which is incorporated by reference herein in its entirety.

FIELD OF THE INVENTION

The present invention relates generally to secure transport protocols. More particularly, this invention relates to layer-4 transparent secure transport protocols for end-to-end application protection.

BACKGROUND

The ability to connect information technology infrastructure reliably, cost-effectively and securely is of high importance for today's global enterprises. To communicate with customers, clients, business partners, employees, etc., the Internet has proven to be more appropriate compared to private communication networks. However, communication via the Internet, which typically uses TCP/IP (Transmission Control Protocol/Internet Protocol), also increases the requirements for data security. Network firewalls are one of the many examples of solutions for network security.

Enterprise Web Application Services build an important foundation for such client, customer, and employee communication. A very common configuration for hosting such enterprise web Application Services is shown in FIG. 1. As shown in FIG. 1, an enterprise can offer web Application Services to various clients and there are several possibilities for clients to connect to the servers depending on the location of the client relative to the servers' location. The servers which provide the Application Services are typically located in the enterprise's data center 1016 and are accessible, directly or indirectly, via World-Wide-Web (WWW) servers 1012. Sometimes enterprises provide access to the Application Services by making the application servers directly accessible by putting those application servers into a Demilitarized Zone (DMZ) 1011.

A client 1003 may connect via a Local Area Network (LAN) through the enterprise's intranet 1013. Another client 1004 may connect through a Wireless LAN (WLAN) to the intranet 1013. Yet another client 1005 may be located inside the enterprise's campus network 1015, which connects to the enterprise's intranet 1013. An enterprise may have zero or more campuses 1014 and 1015. Yet another client 1001 may connect through the Internet 1000, or a client 1002 may have a mobile connection to the Internet 1000. In any case to prevent illegitimate access to the enterprise's web Application Services, the "inside" of the enterprise's network, the intranet 1013, is protected by having a network perimeter 1010, which may comprise firewalls, associated network interconnect, and additional resources "within" the perimeter network configured so as to be broadly accessible to users on the "outside" of the enterprise.

Behind the perimeter 1010, access is granted to legitimate client requests only, while illegitimate access is rejected. The fundamentals in determining whether an access request is legitimate or not are based on the network reference model from the International Organization for Standardization (ISO). This ISO network reference model classifies Network Services into seven layers.

Traditional security products generally assume the existence of a trusted intranet—locations where enterprises control their own LANs, switches and routers—which can be organized into or placed within some type of security perimeter, to protect its resources from the un-trusted Internet. However, in today's business environment, enterprises no longer enjoy the same level of trust and control of their intranets, as enterprises increasingly rely on contractors, partners, consultants, vendors, and visitors on-site for daily operation. As a result, enterprises are exposing internal resources to this wide set of clients whose roles are also frequently changing. Thus, the network trust boundary, delineating inside and outside clients, is disappearing—a phenomenon referred to as "de-perimeterization". In such an environment, protection of an enterprise's resources—such as its intellectual property, as well as mission-critical and operational systems—becomes of critical importance. Also, most security exploits easily traverse perimeter security, as enterprises typically let through email, web and any encrypted network traffic, such as Secure Sockets Layer (SSL), Simple Mail Transfer Protocol (SMTP) with Transport Layer Security (TLS), and authenticated Virtual Private Network (VPN) traffic, for example via IP Security (IPSec). Traditional perimeter security approaches, for example firewalls, intrusion detection systems and intrusion prevention systems have little or no benefit at the perimeter in providing access control functions to the resources. They have become more attack mitigation mechanisms than access control mechanisms. Enterprises are coming to terms with the fact that a hardened perimeter strategy is un-sustainable.

Traditional firewall or router access control lists cannot protect application resources from unauthorized access because network parameters such as Internet Protocol (IP) addresses and IP port numbers no longer deterministically identify resources, nor identify users, clients, or applications accessing these resources. Network firewall technology was invented when enterprises had a limited set of applications such as Telnet, File Transfer Protocol (FTP), and Email, and its primary functions were to limit access to specific applications from the outside and to limit access by systems within the enterprise to specific applications outside the firewall. Network layer parameters such as source, destination IP address and TCP or UDP port numbers were sufficient to identify the client and the operations the clients intended to perform on a particular resource. However, with the proliferation of mobile devices and tunneled applications, the network layer parameters are no longer useful to identify the client, the resource accessed, and the operation. Firewalls have evolved over the time, embracing functions such as deep packet inspection and intrusion detection/prevention, to handle application-level attacks, but the core access control function remains the same.

In effect, de-perimeterization demands that access control functions are positioned close to application resources and that a micro-perimeter is established in the heart of the data center by placing an identity-based policy enforcement point in front of any application resource. Enterprise business drivers for such an enforcement point are the need for rich and uniform protection of resources, business agility via attribute-based, policy-driven provisioning, and regulatory compliance. Traditional server-centric authorization solutions providing role-based authorization often require custom code development, extensive cross-vendor testing whenever there is a version change (of the underlying operating system, agent or application), and are costly and difficult to maintain because of their proprietary nature. Also, traditional server-based network appliances—primarily focused on low-bandwidth ISO Layer-4 to ISO Layer-7 perimeter services—are unsuitable for data center deployment, both in functional richness and in ISO Layer-7 performance.

SUMMARY OF THE DESCRIPTION

Techniques for providing layer 4 transparent secure transport for end-to-end application protection are described herein. According to one embodiment, a packet of a network transaction is received from a client over a first network, where the packet is destined to a server of a data center having a plurality of servers over a second network. The packet includes a payload encrypted without encrypting information needed for a layer 4 of OSI (open system interconnection) layers of network processes. The layer 4 process is performed on the packet without having to decrypt the payload to determine whether the packet is eligible to access the destined server over the second network based on the unencrypted layer 4 information.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
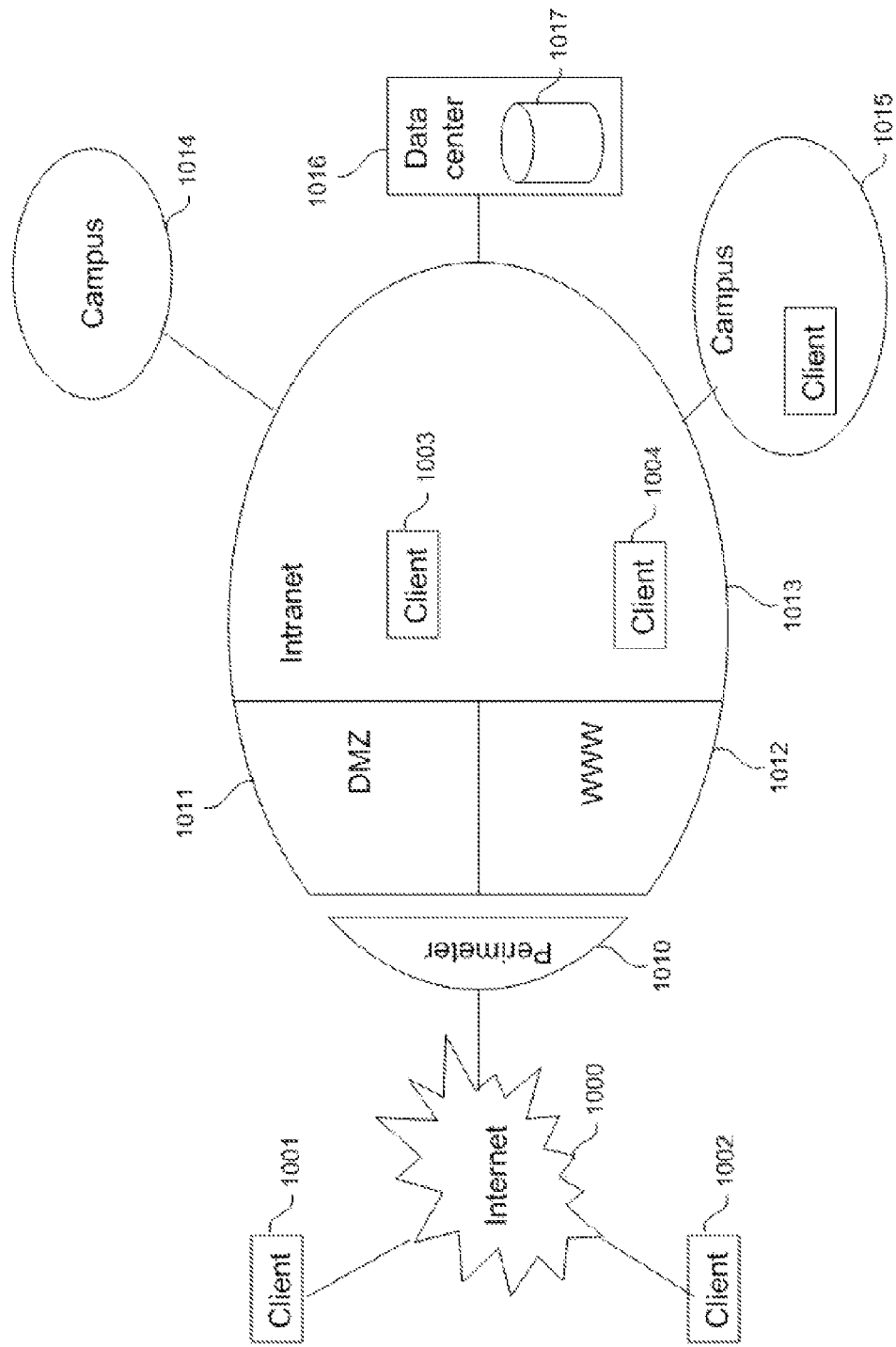
FIG. 1 illustrates a typical corporate computer network connected to the Internet.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

One aspect of the invention provides a Transparent Secure Transport mechanism between client-to-server (or server-to-server) connections which will not break existing ISO Layer-4 networking. While the payload (i.e. the sensitive data) is encrypted for privacy and security, the original TCP and IP headers are kept unchanged. This results in a secure transport method which is transparent to existing ISO Layer-4 network services.

One aspect of the invention is a system and method for Transparent Secure Transport for End-to End Application Protection, comprising a method for secure transport in a network environment using data packets which protects the transported data by encrypting the payload of the data packets and which does not alter the ISO Layer-3 and ISO Layer-4 information of said data packets. The described Transparent Secure Transport (TST) may be dynamically installed and enabled in an endpoint by downloading the requisite TST agent software as needed into, for example, a client system, or, the requisite TST capabilities may be pre-installed in an endpoint.

Overview

The approach described herein applies combinations of parallel, multi-processor computing technology with lossless, low-latency, high-bandwidth network fabric technology (also known as Lossless Data Transport Fabric, or LDTF) to form novel methods and systems for high performance, high-reliability, high availability, and secure network applications. The various embodiments of the inventions described herein enable the implementation of highly reliable, highly scalable solutions for enterprise networking such as, for example, the APS 2000 from FIG. 2.

Multiple network Services are efficiently provided by terminating transport protocols centrally. As can be seen, any transport protocol can be terminated centrally, each PDU's payload can be collected and converted into a data stream and, vice versa, a data stream can be converted into PDUs for any transport protocol and be transported via the given transport protocol. A simple concatenation of the PDU payload into a byte-stream is not sufficient. Key to the conversion is that state information must be maintained about the meta-data of each connection. Such meta-data includes the session information, for example via a unique connection identification number, the transaction information, as well as the information regarding segments and packets. Finite state machines can be used to track the meta-data.

Transport protocols are protocols which are used to transport information via networks. These include, obviously, the ISO Layer-3 protocols such as IPv4, IPv6, IPSec, the ISO Layer-4 protocols such as TCP, UDP, SCTP, the various ISO Layer-5 protocols such as FTP, HTTP, IMAP, SMTP, GTP, L2TP, PPTP, SOAP, SDP, RTSP, RTP, RTCP, RPC, SSH, TLS, DTLS, SSL, IPSec, and VPN protocols. However, other protocols and approaches are contemplated within the scope of the inventions, which serve as transport mechanisms for transmitting information and application data and can also be terminated in a centralized fashion by a protocol proxy and the corresponding PDUs can be transformed into a data stream for application layer processing. Examples of such are, CSIv2, CORBA, IIOP, DCOM and other Object Request Brokers (ORB), MPEG-TS or RTP as a transport for multi-media information, RTSP or SIP as another transport for multi-media information, peer-to-peer transport mechanisms, transport mechanisms based on J2EE such as Java RMI, streaming media protocols such as VoIP, IPTV, etc.

For the sake of simplicity we will use the term Centralized Transport Protocol Termination throughout the rest of the description, however, this is for exemplary purposes only and is not intended to be limiting. Centralized Transport Protocol Termination can be performed by dedicated processing units, and different ISO Layer-7 services can be performed in other dedicated processing units. The use of a lossless low-latency high-bandwidth fabric for inter-process communication between such dedicated processing units makes it possible to simultaneously support Centralized Transport Protocol Termination for multiple services. For example, TCP can be terminated once, transformed into a data stream and this data stream is transported from one dedicated processing unit to another using the lossless low-latency high-bandwidth fabric. The low-latency nature of the fabric helps to reduce the overall latency in client-to-server transactions.

In one embodiment, the Application Protection System (APS) 2000 is a network appliance that can act as a proxy between the client 2001 and the application server 2005, and can determine whether a client 2001 shall be granted access to certain applications 2005. In one example, the client 2001 is one or more of the clients 1001, 1002, 1003, 1004, or 1005 of FIG. 1. In another example, the client 2001 can be a virtual machine or a cluster of computers, or a server (for server-to-server connections, for example). The application server 2005 can be, for example, without limitation, one or more file servers, one or more web servers, one or more database servers, one or more compute servers, one or more storage servers or one or more game servers. The decision whether access is granted or rejected involves an Identity Management Server 2003 to identify the user, client, or application, for example using Lightweight Directory Access Protocol (LDAP) or Active Directory (AD), and is the result of querying a Policy Server 2002 to analyze the access policy for the requested application 2005.

The APS 2000 may use a Triangulated Authorization method which, for example, is based on multiple aspects of a client (such as the client 2001), the requested application (such as application 2005) and certain network characteristics: Who—a client (a user or a machine) and its associated attributes such as department, role, project association, seniority, citizenship, etc; Where—network and environment attributes such as access methods (wire-line/wireless/VPN), location (e.g., USA, Switzerland, China) and time; What—on-the-wire session attributes, including protocol and content/resource attributes. The outcome of this Triangulated Authorization method can be used to determine whether access to an application is granted or rejected. Optionally, a Single-Sign-On (SSO) server such as server 2004 may be involved that allows the client 2001 to obtain authorization for accessing multiple applications at once.

One embodiment of the invention acts as a proxy between one or more clients and one or more application servers to control the access of the one or more clients to the one or more applications. This is described, for example, in FIG. 2, where the APS 2000 controls access of client 2001 to application server 2005. Thereby the approach can act as a high-speed, full proxy which terminates both client-side and server-side transport protocol connections, and which behaves as a virtual server to the one or more clients, and as a virtual client to the one or more servers. The proxy function is required because of the need to reassemble PDUs into data streams and (where needed) to decrypt the payload data for inspection such as access control. The proxy function involves ISO Layer-2 to ISO Layer-5 processing such as Centralized Transport Protocol Termination.

Figure 3:
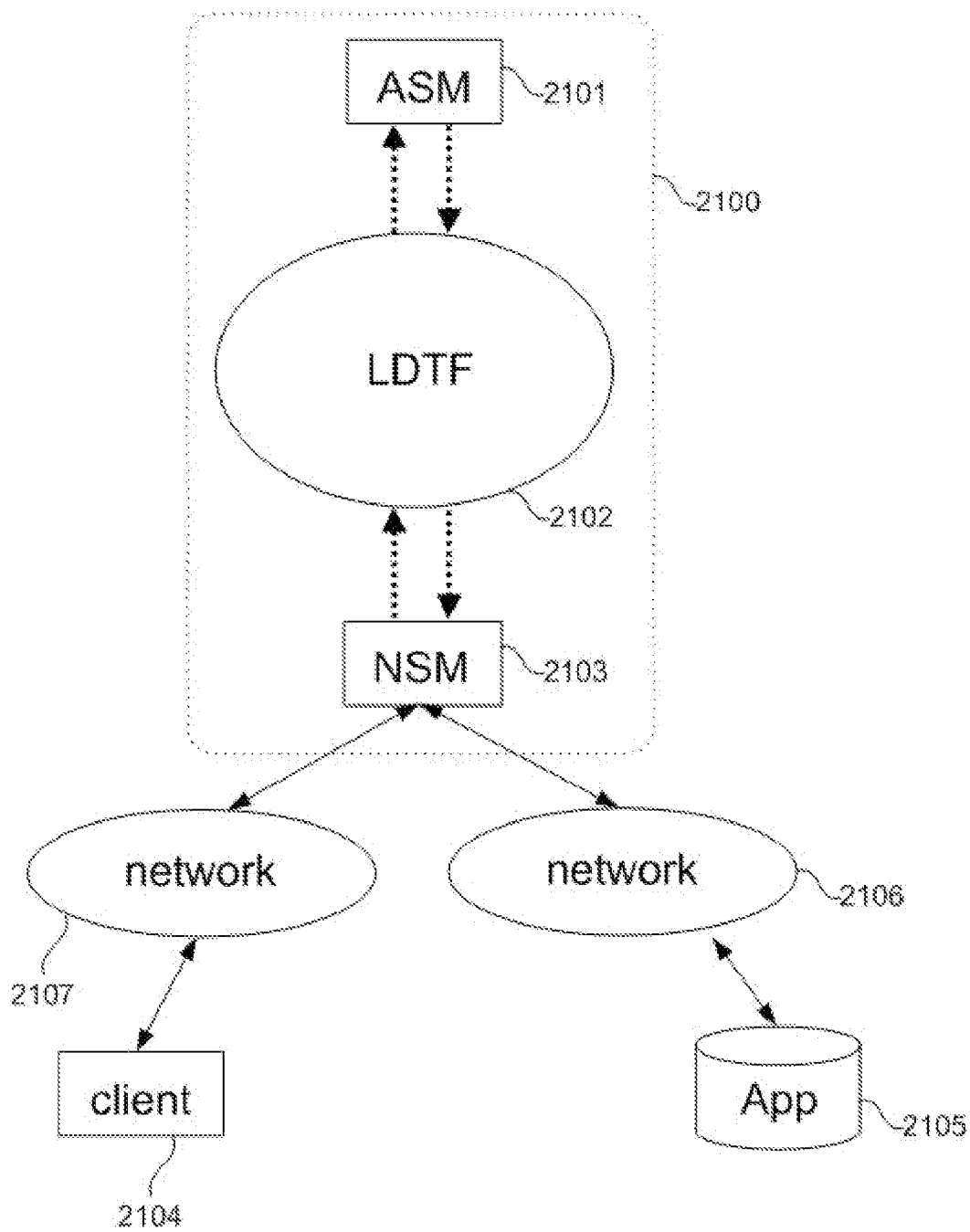
FIG. 3 is a network connected block diagram of an ANA according to one embodiment of the invention.

FIG. 3 is a block diagram illustrating an example of application service appliance system according to one embodiment of the invention. Referring to FIG. 3, ANA 2100 acts as a proxy between a client 2104 and an application server 2105. The client 2104 is connected to the ANA 2100 via a network 2107. Network 2107 can, for example, be a LAN, a WAN, a WLAN, an intranet, or the Internet. The application server 2105 is connected to the ANA 2100 via network 2106. Network 2106 can, for example, be a LAN, a WAN, a WLAN, an intranet, or the Internet. Networks 2106-2107 may be the same network or different networks. While it is apparent that multiple clients and multiple application servers may be connected to the ANA 2100, for the sake of simplicity a single client, single application server case is used as a placeholder throughout. Incoming connections, for example, a request from the client 2104 is terminated in the NSM 2103 and is transformed into a data stream. This is done by PDU processing and reassembling the payload of the PDU into a data stream of ISO Layer-7 application data. This data stream is transported via LDTF 2102 to the ASM 2101 for further ISO Layer-7 processing. LDTF 2102 may be an RDMA or IB compatible fabric. The result of ISO Layer-7 processing done by ASM 2101 is then transported back—still as a data stream—via the LDTF 2102 to the NSM 2103. The NSM 2103 then transforms the data stream into PDUs and sends the PDUs to the application server 2105 via the appropriate transport protocol. Connections which originate from the application server 2105 can be handled similarly. Using this novel approach, both processing domains can be scaled independent of each other and a well-balanced system can be achieved at reasonable costs.

Transparent Secure Transport Based on Policies

For end-to-end protection, one embodiment of the invention can provide encrypted Transparent Secure Transport for client sessions without breaking existing ISO Layer-2 to ISO Layer-4 services. Because the primary target of this function is to provide data privacy for internal communication, it is important to keep visibility to network headers so that network operators can continue to use traditional traffic monitoring and protocol analysis tools. Also this approach allows the Transparent Secure Transport function to co-exist with existing network layer services such as access control lists (ACL) and Quality of Service (QoS). The Transparent Secure Transport functionality allows creation of resource enclaves with different levels of security. For example, all sessions destined to high-security enclaves would always be encrypted while sessions destined to medium-security enclaves would be cryptographically authenticated only. Like the Triangulated Authorization service support, the Transparent Secure Transport service of our approach is non-invasive to application resources.

Figure 4:
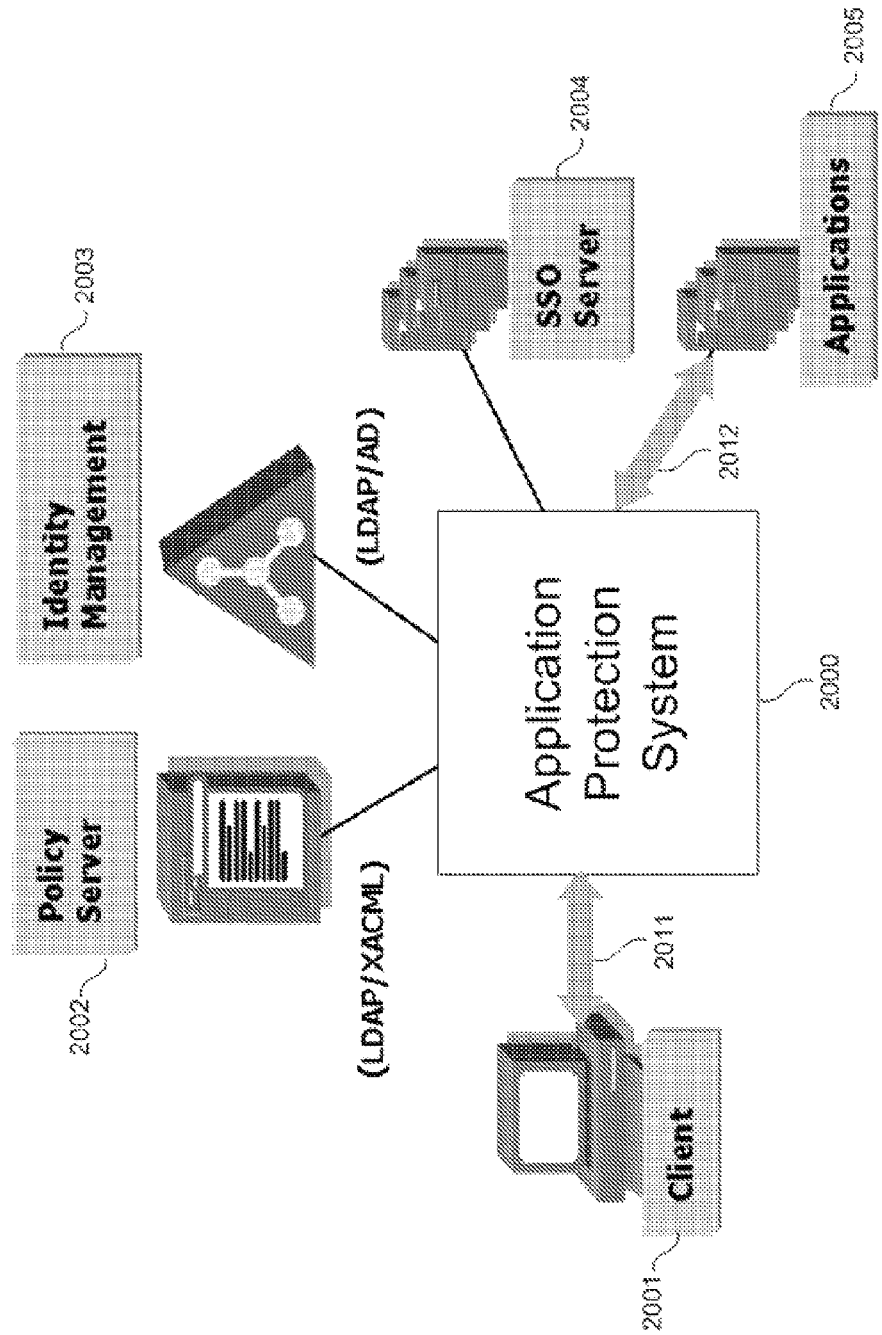
FIG. 4 is a block diagram of a use case of Triangulated Authorization with Transparent Secure Transport in an ANA according to one embodiment of the invention.

FIG. 4 illustrates one embodiment of the invention where both the front-end connection between the client 2001 and the APS 2000 can utilize Transparent Secure Transport 2011 and the back-end connection between the APS 2000 and the application server 2005 can use Transparent Secure Transport 2012. Application resources can be segmented in multiple security zones based on the sensitivity of the data transmitted.

Different security zones can be created with different levels of security based on policies. For example, encryption and integrity checks may be used for very sensitive data. In this case the payload in the each packet is encrypted and an integrity code (for example, a Message Authentication Code) is added to make sure there is no tampering with the encrypted data in between. For less sensitive data, only integrity codes may be added to each packet to make sure no one tampers with the data in between; however, the data itself is not encrypted.

The Transparent Secure Transport of this approach, for example, Transparent Secure Transport 2011 or Transparent Secure Transport 2012, are transparent to existing ISO Layer-4 services, unlike other approaches known in the art such as IPSec or SSL-based VPN. For example, a packet, which is transported via IPSec's Transport Mode, will have its TCP header encrypted. A packet includes an Original IP header, a TCP header and data, which is transported via IPSec's Tunneling Mode will not only have the TCP header but also have the Original IP header encrypted. In both cases this prevents existing ISO Layer-4 services from analyzing such network traffic because the original IP header and the TCP header are not visible anymore during such secure transport.

Transparent Secure Transport for End-to-End Application Protection

Figure 2:
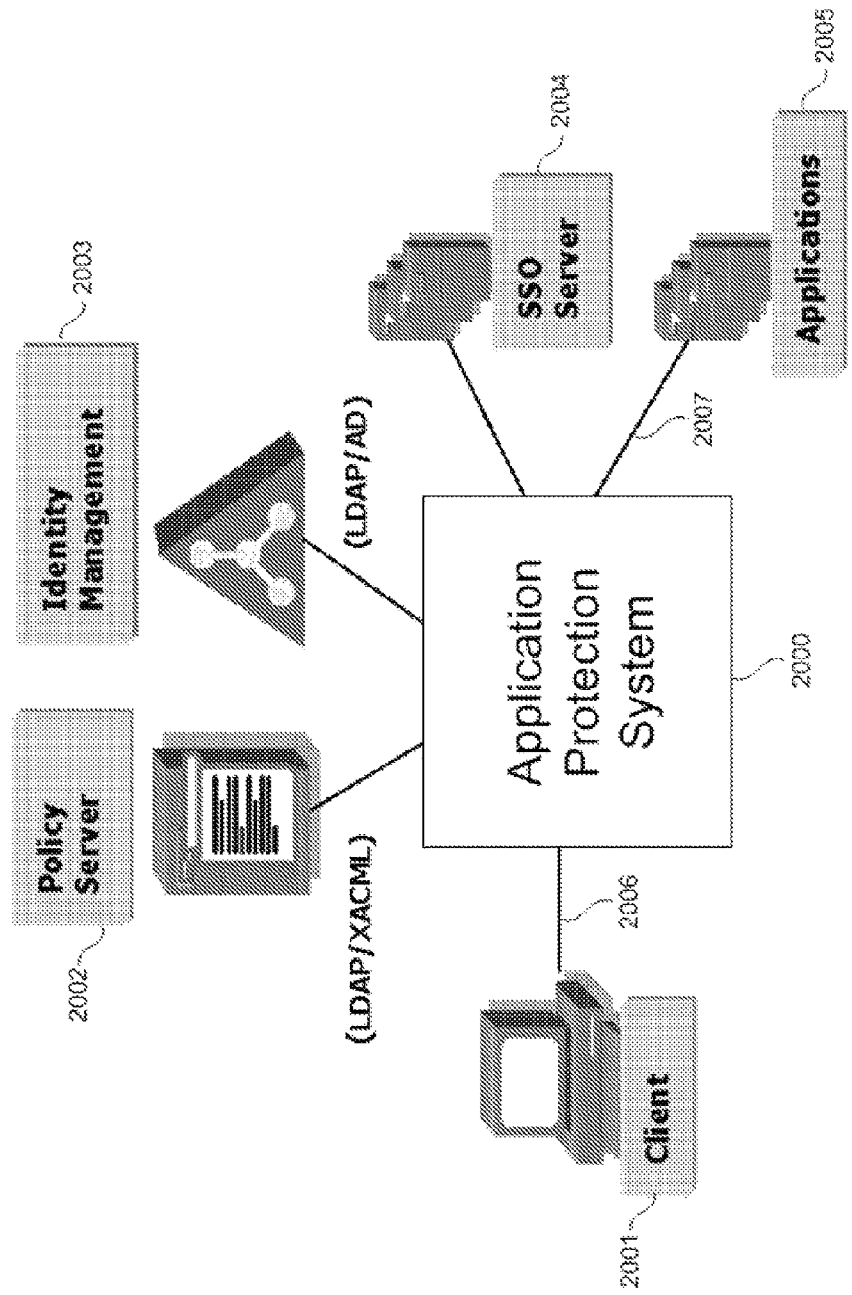
FIG. 2 illustrates the application of an application network appliance (ANA) as the APS according to one embodiment of the invention.

In one embodiment of the invention described herein, the ANA shown in FIG. 4 where a client 2001 can access applications 2005 and where the access to such applications 2005 is controlled by the APS 2000 of FIG. 2. For security and for privacy reasons the connection between the client 2001 and the APS 2000 and the connection between the APS 2000 and the application server 2005 can be protected by encryption, for example. While the secure transport approaches known in the art are not transparent to ISO Layer-4 networking, because the original TCP/IP header may get encrypted and replaced (see above), in one embodiment of the invention, a novel, Transparent Secure Transport system and method is disclosed.

Figure 5:
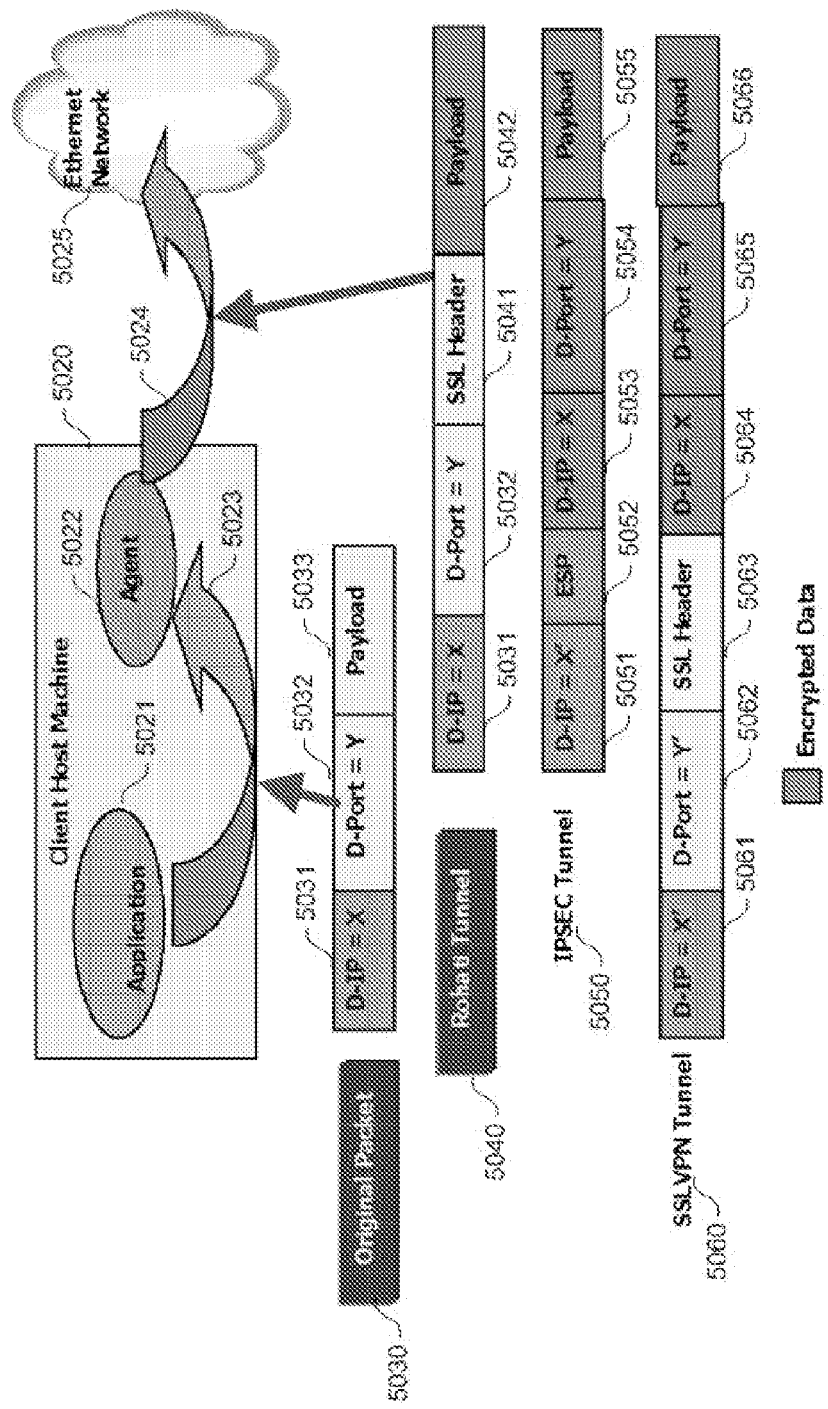
FIG. 5 is a block diagram which illustrates the various approaches for secure transport, including Transparent Secure Transport according to one embodiment of the invention.

FIG. 5 illustrates the functioning of the novel, Transparent Secure Transport as compared to other secure transport approaches known in the art. Within a Client Host Machine 5020 an application 5021 sends data to transport agent 5022. The data 5023 transmitted can look like TCP packet 5030 which comprises a header with the destination IP address 5031, the destination TCP port number 5032 and the payload 5033, all unencrypted, in clear-text. (This disclosure is relevant for TCP over IP; if another IP-based protocol is used, the disclosure still applies, but some of the parameters may differ. For example, some IP-based protocols do not use TCP and thus do not have a TCP port number available. However, the mechanism can still function in a similar manner.) When agent 5022 sends the data 5024 over an Ethernet network 5025 for privacy and security reasons the data 5024 gets encrypted. In one approach known in the art, IPSec Tunneling, the entire original packet 5030 gets encrypted into portions 5053, 5054, 5055 and ESP information 5052 and new IP destination information 5051 gets added. In one other approach known in the art, SSL-VPN Tunneling, the entire original packet 5030 gets encrypted as well and SSL header information 5063 gets added together with new IP destination 5061 and TCP port number 5062 information. In both approaches, the original IP information 5031 and 5032 gets encrypted (into 5053 and 5054, or into 5064 and 5065) and thus becomes inaccessible to ISO Layer-4 network analysis.

This drawback of encrypting the original IP information is solved by one embodiment of the invention described herein. According to one embodiment of the invention, the original data packet 5030 can be sent by transporting it within the packet 5040. The original destination IP address 5031 and the original destination TCP port number 5032 are used unencrypted such that ISO Layer-4 network analysis can seamlessly be applied. Therefore the transport mechanism of this approach is transparent to existing networking. And because the original payload 5033 gets encrypted into the encrypted payload 5042 plus an encryption header, for example SSL header 5041, the transport is also secure. In one embodiment of the invention, SSL is used for encrypting the payload. In another embodiment of the invention, DTLS is used for encrypting the payload.

Figure 6:
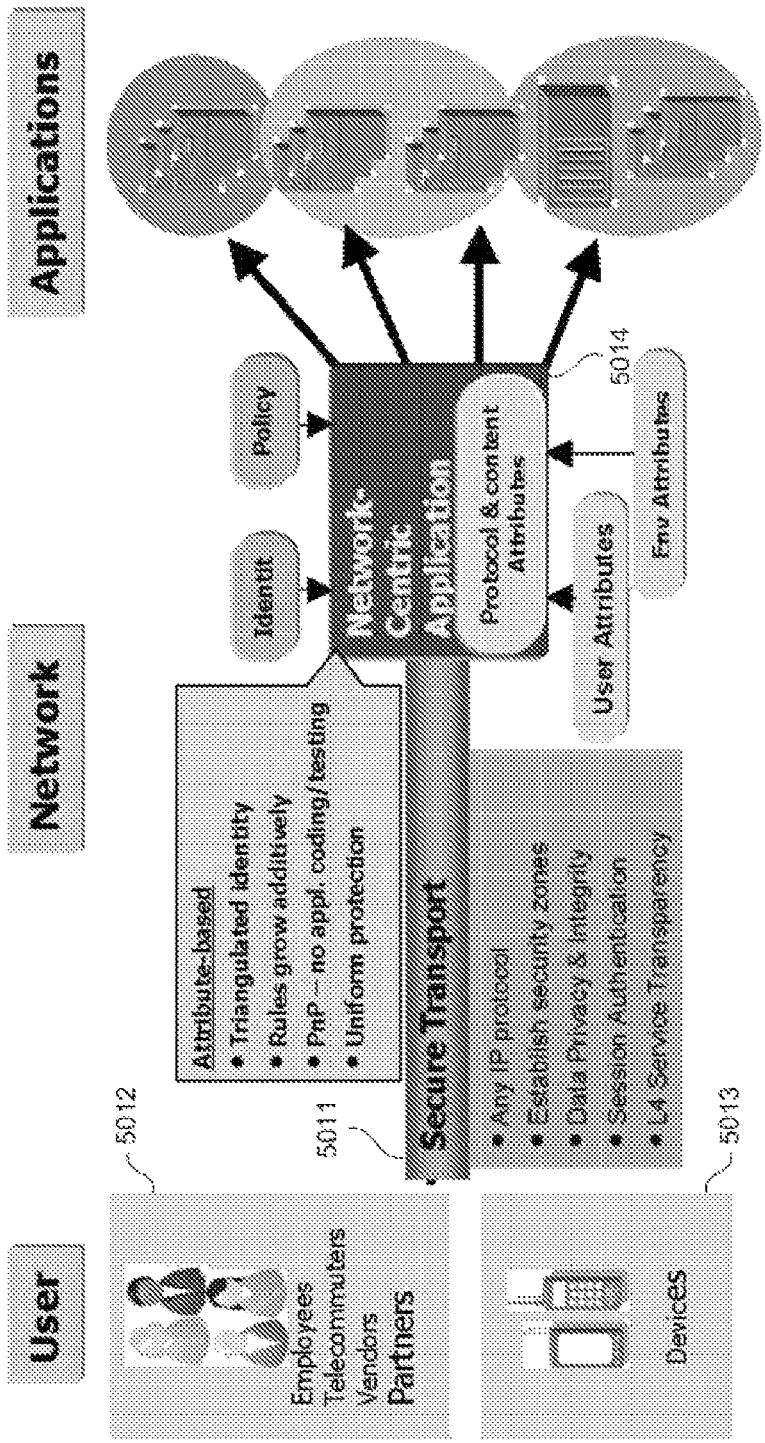
FIG. 6 is a block diagram of an ANA deploying Transparent Secure Transport according to one embodiment of the invention.
Figure 7:
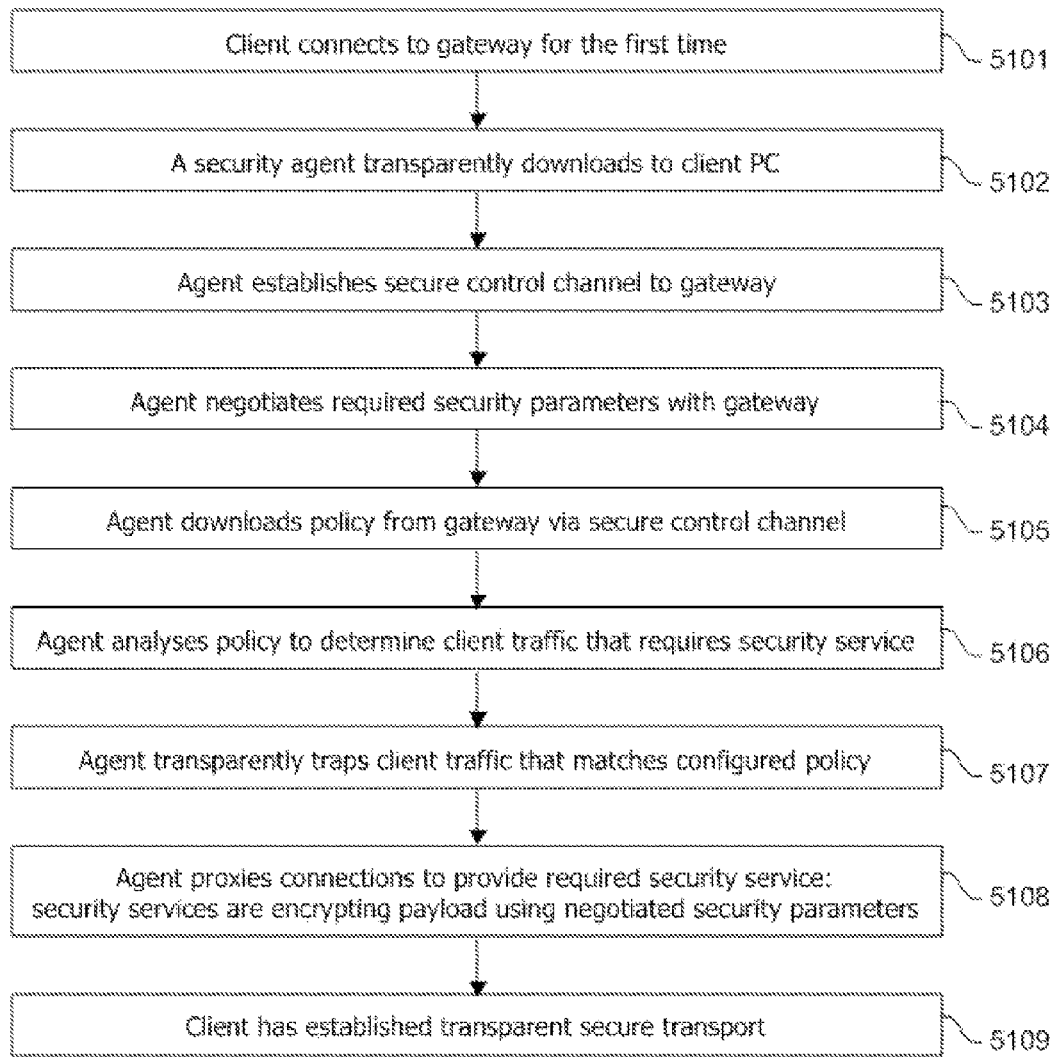
FIG. 7 is a flow diagram of a method for Transparent Secure Transport in an ANA according to one embodiment of the invention.

FIG. 6 shows the application of Transparent Secure Transport to perform policy-based access-control and policy-based Transparent Secure Transport, according to one embodiment of the invention. Users and clients, such as 5012, can use various devices 5013 to access various network-centric applications 5014. Depending on the current policy which determines access to the application, the Transparent Secure Transport 5011 can be used for communication between the client 5012 and applications 5014. This communication method can, for example, use a client-side agent as it is illustrated in FIG. 7: In step one 5101, a client connects to the gateway for the first time. This gateway can, for example, be APS 2000 of FIG. 4. In a second step 5102, a security agent transparently gets downloaded to and installed onto the client. This client can, for example, be client 2001 of FIG. 4. The security agent can, for example, be agent 5022 of FIG. 5 and can, for example, be a plug-in for a common web browser such as Mozilla Firefox. In a third step 5103, the agent establishes a secure control channel to the gateway. In a fourth step 5104, the agent negotiates the required security parameters with the gateway. In a fifth step 5105, the agent downloads the policy from the gateway via the secure control channel. In a sixth step 5106, the agent analyzes the policy to determine the client traffic that requires Transparent Secure Transport. In a seventh step 5107, the agent transparently traps the client traffic that matches the configured policy. In an eighth step 5108, the agent proxies connections to provide the required security service by encrypting the traffic's payload using the negotiated security parameters. In a ninth step 5109, the client has established Transparent Secure Transport with the applications. This Transparent Secure Transport can, for example, use packets as shown for packet 5040 of FIG. 5. The order of the above steps is exemplary only, and is not intended to be limiting.

Figure 8:
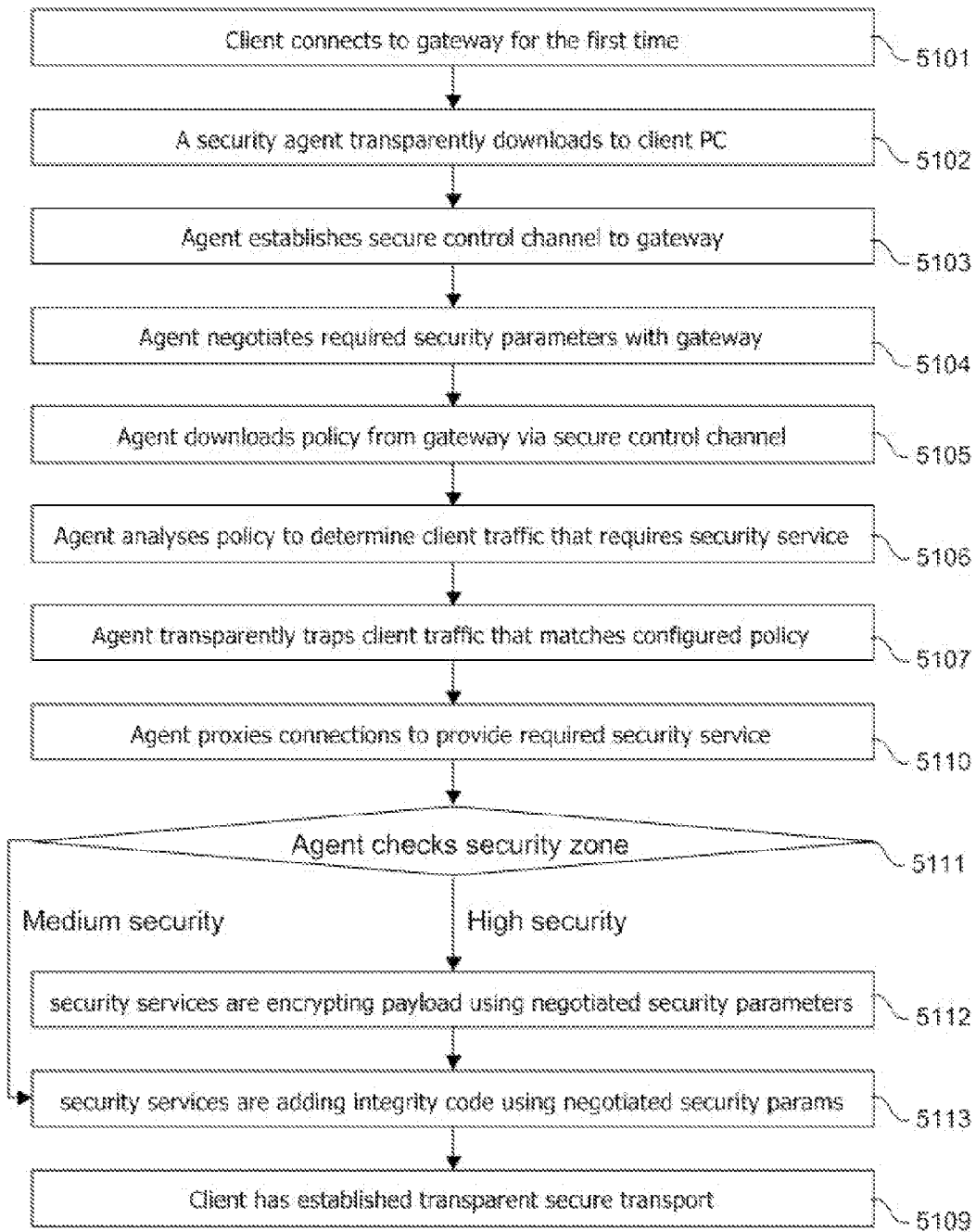
FIG. 8 is a flow diagram of a method for Transparent Secure Transport depending on security zones in an ANA according to one embodiment of the invention.

In another embodiment of the invention, the Transparent Secure Transport can use a different Transparent Secure Transport depending on a particular security zone configured in a policy. This is described in conjunction with FIG. 8. In a first step 5101, a client connects to the gateway for the first time. In a second step 5102, a security agent transparently gets downloaded to and installed onto the client. In a third step 5103, the agent establishes a secure control channel to the gateway. In a fourth step 5104, the agent negotiates the required security parameters with the gateway. In a fifth step 5105, the agent downloads the policy from the gateway via the secure control channel. In a sixth step 5106, the agent analyzes the policy to determine the client traffic that requires Transparent Secure Transport. In a seventh step 5107, the agent transparently traps the client traffic that matches the configured policy. In an eighth step 5110, the agent proxies connections to provide the required security service. In a decision 5111, the agent checks the security zone configured in the downloaded policy. If the security zone only requires medium security, the method continues at step 5113. However, if the security zone requires high security, the method continues with step 5112 in which the payload is encrypted using the negotiated security parameters. In step 5113, the agent adds an integrity code (such as a Message Authentication Code (MAC), for example), using the negotiated security parameters. In a last step 5109, the client has established Transparent Secure Transport with the applications. In yet another embodiment of the invention, if the security zone only requires low security, no encryption may be performed on the payload and no integrity code may be added but just authorization may be performed. The order of the above steps is exemplary only, and is not intended to be limiting.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
at a service module of a network device, receiving a packet of a network transaction from a client device over a first network;
obtaining policy information from a gateway device via a secure control channel;
analyzing the policy information to determine a security zone classification associated with the packet;
when the security zone classification requires high security for the packet:
encrypting a portion of the packet with an encryption header that contains payload information while maintaining an unencrypted portion of the packet comprising destination address information of the packet such that layer 4 processing can be applied to the packet;
adding to the packet an integrity code that is associated with the payload information to authenticate the packet;
performing layer 2 to layer 4 (layer 2-4) processes on the unencrypted portion of the packet without having to decrypt the encrypted portion of the packet such that the packet maintains a transparent secure transport function; and
evaluating an authorization of the packet to determine whether the packet is eligible to access a server of a data center over a second network based on network characteristics of the packet obtained from the layer 2-4 processes.

2. The method of claim 1, wherein performing the layer 2-4 processes comprises performing a layer 4 access control process for transparent secure transport of the packet to determine whether the packet is eligible to access the server over the second network based on unencrypted layer 4 information.

3. The method of claim 1, wherein evaluating the authorization comprises determining whether the packet is eligible to access the server when the second network is an internal network of an organization associated with the data center.

4. The method of claim 1, wherein receiving comprises receiving the packet such that at least an Internet Protocol (IP) header containing a destination IP address and a Transport Control Protocol (TCP) header containing a destination TCP port of the packet is not encrypted and remains unchanged while the payload information of the packet is encrypted.

5. The method of claim 1, wherein receiving comprises receiving the packet that is encrypted by a security agent of the client device, wherein the security agent encrypts at least the payload information of the packet without encrypting information in the packet needed for the layer 2-4 process.

6. The method of claim 5, further comprising:
at the service module, receiving information of the security agent over the first network in response to a request from the client device to initiate a network connection; and
transmitting a plurality of security parameters to the client device over the secure control channel for a policy associated with the client device.

7. The method of claim 6, further comprising:
establishing a secure control channel with the security agent over the first network in response to a request received from the security agent; and
negotiating the security parameters with the agent over the secure control channel.

8. The method of claim 7, further comprising:
trapping network traffic if the network traffic requires a security service based on the policy associated with the client device;
receiving the packet with the encrypted payload information of the network traffic that has been encrypted using the security parameters if the network traffic requires a security service; and
performing layer 3 to layer 4 (layer 3-4) processes on unencrypted information of the packet.

9. The method of claim 1, wherein receiving comprises receiving the packet at the service module of the network device that is a security gateway between the client device and a plurality of servers of the data center.

10. The method of claim 8, wherein receiving comprises receiving the packet over the first network that is an external network such that the network traffic is encapsulated within a secure tunnel over the first network which is terminated at the network element to recover packets with the encrypted payload and unencrypted information from the layer 3 to layer 4 (layer 3-4) processes.

11. The method of claim 1, and further comprising obtaining network characteristics of the packet from the layer 2-4 processing of the packet, wherein evaluating the authorization of the packet comprises determining comprises determining whether the packet is eligible to access the server based on the network characteristics that comprise one or more of client device attributes, network environment attributes and protocol and resource attributes.

12. A non-transitory machine-readable storage device storing instructions that, when executed by a machine, causes the machine to:
receive at a service module of a network device a packet of a network transaction from a client device over a first network;
obtain policy information from a gateway device via a secure control channel;
analyze the policy information to determine a security zone classification associated with the packet;
when the security zone classification requires high security for the packet: encrypt a portion of the packet with an encryption header that contains payload information while maintaining an unencrypted portion of the packet comprising destination address information of the packet such that layer 4 processing can be applied to the packet;
add to the packet an integrity code associated with the payload information to authenticate the packet;
perform layer 2-4 processes on the unencrypted portion of the packet without having to decrypt the encrypted portion of the packet such that the packet maintains a transparent secure transport function; and
evaluate an authorization of the packet to determine whether the packet is eligible to access a server of a data center over a second network based on network characteristics of the packet obtained from the layer 2-4 processes.

13. The non-transitory machine-readable storage device of claim 12, wherein the instructions that cause the machine to perform the layer 2-4 processes comprise instructions that cause the machine to perform a layer 4 access control process for transparent secure transport of the packet to determine whether the packet is eligible to access the server over the second network based on the unencrypted layer 4 information.

14. The non-transitory machine-readable storage device of claim 12, wherein the instructions that cause the machine to evaluate the authorization of the packet comprise instructions that cause the machine to determine whether the packet is eligible to access the server when the second network is an internal network of an organization associated with the data center.

15. The non-transitory machine-readable storage device of claim 12, wherein the instructions that cause the machine to receive the packet comprise instructions that cause the machine to receive the packet such that at least an Internet Protocol (IP) header containing a destination IP address and a Transport Control Protocol (TCP) header containing a destination TCP port of the packet is not encrypted and remains unchanged while the payload information of the packet is encrypted.

16. The non-transitory machine-readable storage device of claim 12, wherein the instructions that cause the machine to receive the packet comprise instructions that cause the machine to receive the packet that is encrypted by a security agent of the client device, wherein the security agent encrypts at least the payload information of the packet without encrypting information in the packet needed for the layer 2-4 process.

17. The non-transitory machine-readable storage device of claim 16 further comprising instructions that cause the machine to: receive information of the security agent over the first network in response to a request from the client device to initiate a network connection; and transmit a plurality of security parameters to the client device over the secure control channel for a policy associated with the client device.

18. The non-transitory machine-readable storage device of claim 17 further comprising instructions that cause the machine to: establish a secure control channel with the security agent over the first network in response to a request received from the security agent; and negotiate the security parameters with the agent over the secure control channel.

19. The non-transitory machine-readable storage device of claim 18 further comprising instructions that cause the machine to: trap network traffic if the network traffic requires a security service based on the policy associated with the client device; receive the packet with the encrypted payload information of the network traffic that has been encrypted using the security parameters if the network traffic requires a security service; and perform layer 3 to layer 4 (layer 3-4) processes on unencrypted information of the network traffic.

20. The non-transitory machine-readable storage device of claim 19, wherein the instructions that cause the machine to receive the packet comprise instructions that cause the machine to receive the packet over the first network that is an external network such that the network traffic is encapsulated within a secure tunnel over the first network which is terminated at the network element to recover packets with an encrypted payload and unencrypted information from the layer 3 to layer 4 (layer 3-4) processes.

21. The non-transitory machine-readable storage device of claim 12, wherein the instructions that cause the machine to receive the packet comprise instructions that cause the machine to receive the packet at the service module of the network device that is a security gateway between the client device and a plurality of servers of the data center.

22. The non-transitory machine-readable storage device of claim 12, and further comprising instructions that caused the processor to obtain network characteristics of the packet from the layer 2-4 processing of the packet, and wherein the instructions that cause the processor to evaluate the authorization of the packet comprise instructions that cause the processor to determine whether the packet is eligible to access the server based on the network characteristics that comprise one or more of client device attributes, network environment attributes and protocol and resource attributes.

* * * * *

UNITED STATES PATENT AND TRADEMARK OFFICE
CERTIFICATE OF CORRECTION

PATENT NO. : 8,295,306 B2  Page 1 of 1
APPLICATION NO. : 12/101862
DATED : October 23, 2012
INVENTOR(S) : Bagepalli et al.

It is certified that error appears in the above-identified patent and that said Letters Patent is hereby corrected as shown below:

On the Title Page of the Patent, (73) Assignee:, replace "Cisco Technologies, Inc." with -- Cisco Technology, Inc. --.

Signed and Sealed this
Twenty-second Day of January, 2013

David J. Kappos
*Director of the United States Patent and Trademark Office*